Dec. 18, 1934.  W. R. GRISWOLD  1,984,578
INTERNAL COMBUSTION ENGINE
Filed Oct. 17, 1932  2 Sheets-Sheet 1
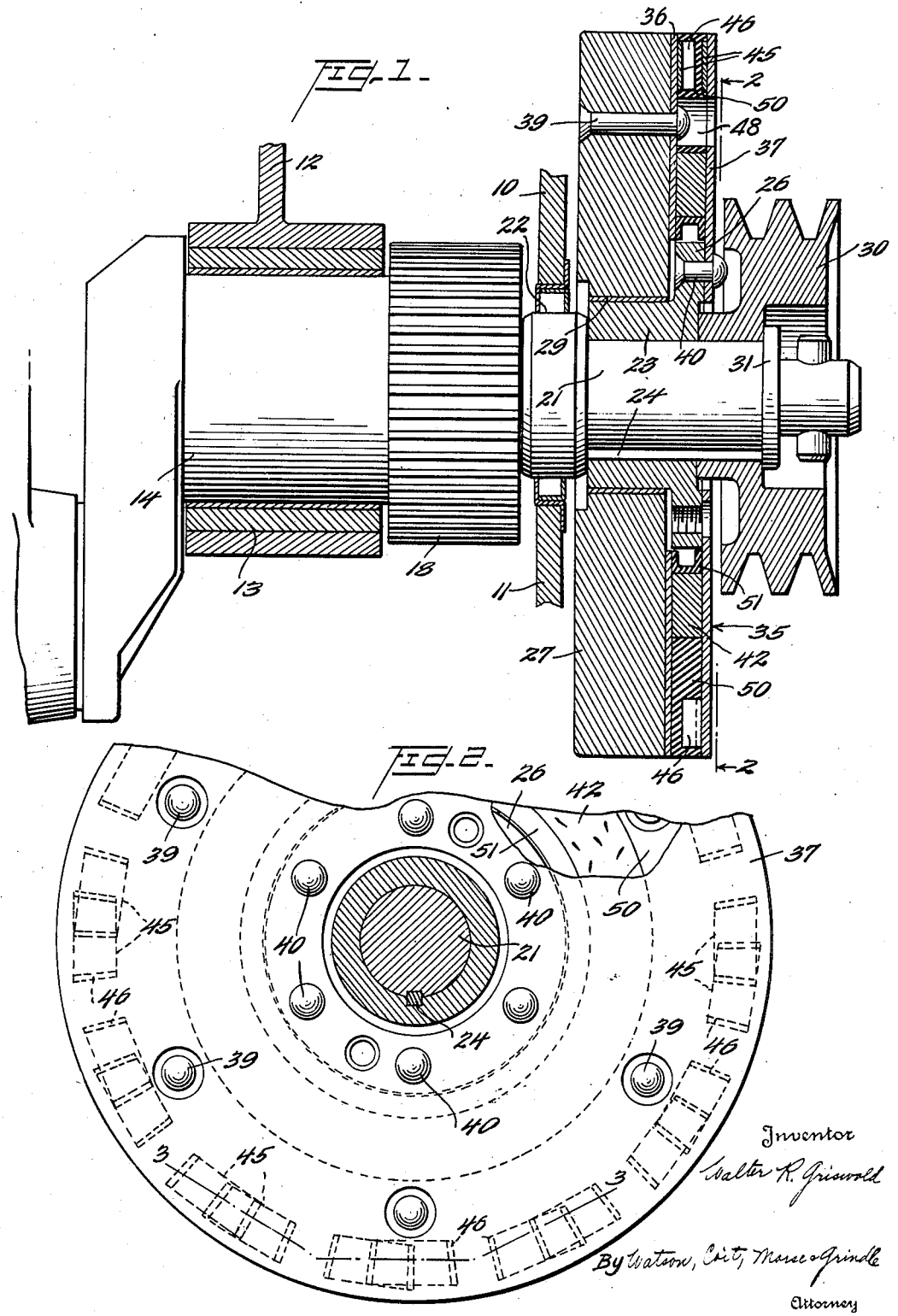

Dec. 18, 1934.   W. R. GRISWOLD   1,984,578
INTERNAL COMBUSTION ENGINE
Filed Oct. 17, 1932   2 Sheets-Sheet 2
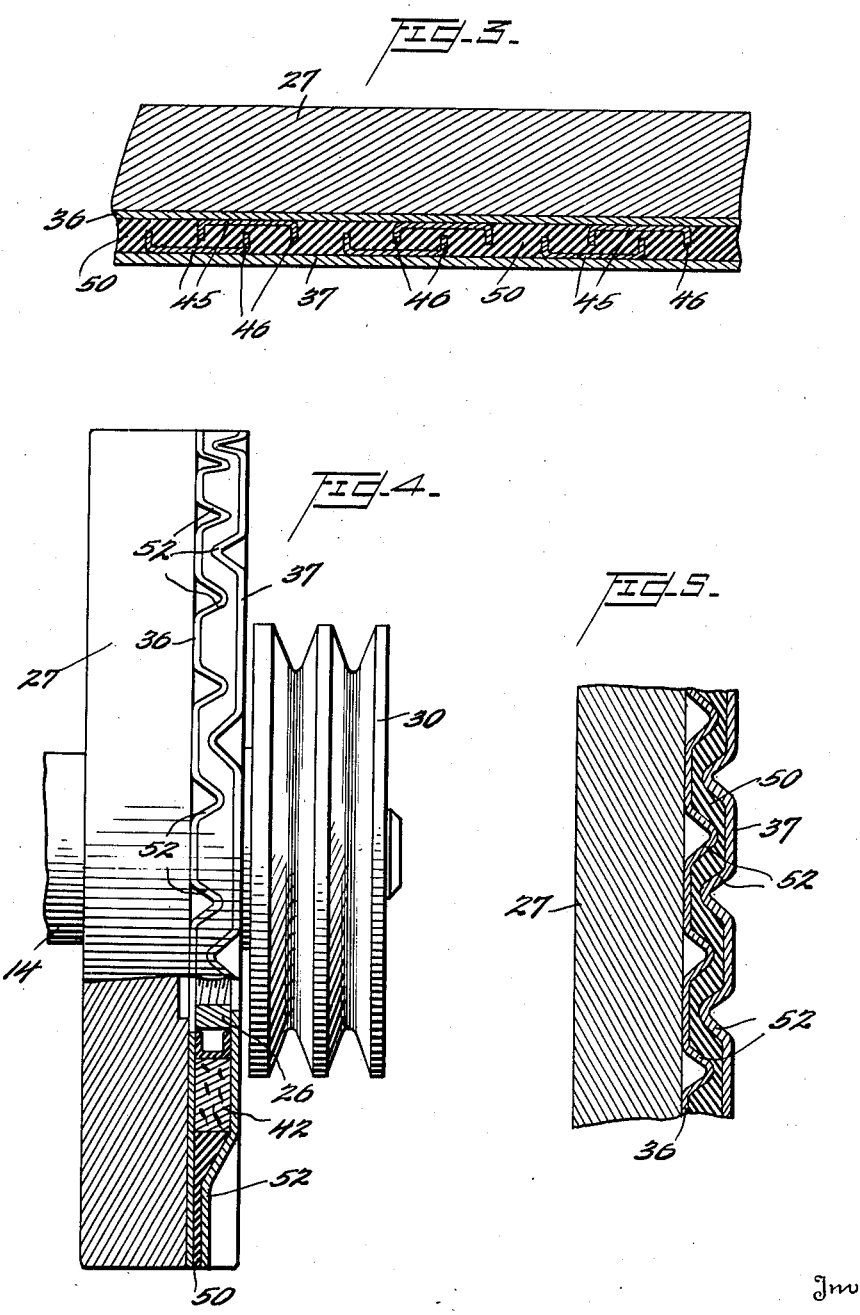

Patented Dec. 18, 1934

1,984,578

UNITED STATES PATENT OFFICE 1,984,578

INTERNAL COMBUSTION ENGINE

Walter R. Griswold, Detroit, Mich., assignor to Packard Motor Car Company, Detroit, Mich., a corporation of Michigan Application October 17, 1932, Serial No. 638,261

20 Claims. (Cl. 74—574)

This invention relates to internal combustion engines and has for its object the provision of means for damping torsional vibrations induced in the engine crankshaft as the result of the periodic torque impulses applied thereto.

It is a feature of the invention that the various component parts of the damper may be separately and cheaply constructed and readily assembled.

The damper which forms the basis of the present invention is of the type employing an inertia member mounted for slight displacement relatively to the crankshaft on the occurrence of torsional vibrations in the shaft, and a coupling between the inertia member and the shaft, this coupling serving both to yieldingly connect the inertia member to the shaft in such manner as to permit slight relative displacement, and as an energy absorbing device, the energy of vibrations being dissipated in the form of heat as the result of friction developed in the coupling on relative displacement of the inertia member and crankshaft.

It is an object of the invention to provide a coupling of this character which may be separately assembled as a complete unit and readily applied to an inertia member of conventional design, the coupling being so formed that friction developing surfaces which are incorporated therein are completely confined so that the friction between these surfaces will not be varied by the entry of foreign matter such as dust, oil, or water therebetween.

It is a further object of the invention to provide a torsional damper in which the coupling unit acting between the inertia member and the crankshaft comprises yielding means of elastic material, such as rubber, and further energy absorbing means comprising friction surfaces which are relatively movable in displacement of the inertia member with respect to the shaft, the yielding means being initially deformed in such manner that the resulting stress may be applied to urge the cooperating friction surfaces into intimate contact and to develop a definite degree of friction between these cooperating surfaces.

Further objects and features of the invention will be apparent from the following description taken in connection with the accompanying drawings, in which Figure 1 is a longitudinal vertical section through part of an internal combustion engine provided with a vibration damper constructed in accordance with the principles of the invention;

Figure 2 is a sectional view on the line 2—2 of Figure 1 partly broken away;

Figure 3 is a sectional view taken substantially on the line 3—3 of Figure 2;

Figure 4 is a side elevational view partly in section corresponding to Figure 1 but illustrating a slightly modified construction; and Figure 5 is a fragmentary sectional view corresponding to Figure 4 and illustrating a further modification.

Referring more specifically to the drawings, it will be observed that the reference numeral 10 designates a portion of the crankcase of an internal combustion engine having a lower cover or oil pan 11 and provided with transverse webs as indicated at 12. The webs 12, of which several are provided, serve to support suitable aligned bearings for the engine crankshaft 14, only the front bearing 13 being shown in the drawings. It will be understood that the arrangement thus far described is conventional and that the crank shaft and associated parts may be of the usual construction.

Forwardly of the forward bearing 13, the crankshaft 14 is preferably provided with a reduced portion on which a gear or chain sprocket 18 may be keyed or otherwise secured, this gear being used to drive the engine cam shaft or other engine accessories not shown in the drawings. Forwardly of the gear 18, the crankshaft is further reduced in section as shown at 21 and projects through a suitable opening 22 in the front wall of the crankcase 10.

The vibration damper of this invention is illustrated as mounted at or adjacent the reduced end portion 21 of the crankshaft 14. It comprises a supporting portion or hub 23, keyed or otherwise rigidly secured to the reduced portion 21 of the crankshaft as indicated at 24, this hub being provided with a radially disposed integral flange 26. Surrounding the hub 23 is an inertia member 27, this inertia member being preferably integrally formed and being supported for rotative displacement with respect to the crankshaft by the bearing 29 on the hub 23, this bearing being concentric with the crankshaft axis.

The reduced portion 21 of the crankshaft and the key 24 are extended forwardly of the hub member 23 to receive a fan pulley 30 which is retained in position on the crankshaft by means of a nut 31. It will be observed from Figure 1 of the drawings that the nut 31 serves to retain the hub 23 of the damper and the pulley 30 on the forward end of the shaft against axial displacement with respect thereto.

It will be appreciated that the arrangement thus far described is more or less conventional, the novelty of the present invention residing primarily in the construction of the coupling member which serves to connect the inertia member 27 to the hub 23 and thence to the shaft. Various changes may be made in the details hereinbefore mentioned without affecting the construction of this coupling member.

The coupling member, indicated generally at 35, comprises relatively movable elements 36 and 37, these elements being carried by the inertia member 27 and the hub member 23 respectively. It will be observed that each of these elements is illustrated as comprising an annular, relatively thin sheet metal plate, the plate 36 being secured to and against the forward face of the inertia member 27 by means of a plurality of circumferentially disposed rivets 39 and the plate 37 being secured to the radial flange 26 of the hub 23 by means of a plurality of rivets 40. The plates 36 and 37 are shown as spaced axially of the crankshaft and may be said to be provided with opposed friction faces between which is positioned a friction developing means 42, preferably in the form of an annulus of any well-known friction developing material such as cork, asbestos, or the like. Ground cork impregnated with a binder has been found particularly suitable.

It is apparent from this construction that upon the occurrence of vibrations in the shaft tending to effect relative rotative displacement of the crankshaft 14 and the inertia member 27, the plates 36 and 37 will partake of this relative displacement and, by reason of their intimate contact with the friction developing device 42, will retard such relative movement. The friction developed at the engaging faces of the plates 36 and 37 and the corresponding faces of the annulus 42 will serve to dissipate the vibrational energy of the shaft in the form of heat, and the amount of friction developed at these cooperating faces will be, of course, dependent upon the pressure applied to the plates 36 and 37 to force them into engagement with the annulus 42.

As shown more particularly in Figures 2 and 3, each of the plates 36 and 37 is so constructed as to provide a plurality of axially extending projections, these projections preferably taking the form of substantially U-shaped sheet metal elements 45. The base of each element 45 may be secured to the associated plate 36 or 37 by welding, the legs 46 of the U-shaped elements forming projections of substantial depth measured radially of the damper. The remaining space between the elements 36 and 37 outwardly of the annular friction element 42 is completely filled with elastic or yielding material 50 such as rubber, with the exception that a plurality of apertures 48 are provided in this yielding material to permit the introduction and manipulation of the rivets 39 which serve to secure the plate 36 to the inertia member 27. This yielding material is preferably bonded to the opposed faces of the plates 36 and 37, for instance in the case of rubber, by the vulcanization of the rubber to these faces.

In applying the friction developing element 42 and the rubber element 50 intermediate the plates 36 and 37, it is preferable to position these elements and then to press the plates toward each other, the rubber being vulcanized while the plates are held under compression. In this manner an initial pressure is applied to the annular element 42, and upon the release of the plates, the friction developing element 42 expands slightly, this expansion being resisted by the rubber 50 which is thus placed under a slight initial tension. In this manner the necessary pressure at the friction developing surfaces may be accurately regulated and definitely maintained by the tension of the rubber element 50 exerted in a direction axially of the crankshaft.

Thus on the occurrence of relative rotative displacement between the inertia member and the shaft, the yielding means 50 is distorted by reason of the fact that it is bonded to the opposed surfaces of the plates 36 and 37, and more particularly by the application of direct compression to the yielding means 50 between the adjacent legs 46 of the elements 45 carried by the relatively moving parts of the damper, the elements 45 being arranged in staggered relation for this purpose as shown more particularly in Figure 3.

The assembly of the coupling member 35 is preferably completed by the insertion of an additional annular element 51 within the friction developing element 42 and between the plates 36 and 37, the element 51 being preferably of rubber and vulcanized to the associated plates.

By this construction, the friction developing element 42 is entirely enclosed, the yielding means cooperating with the annular plates 36 and 37 to completely exclude foreign matter from the cooperating friction developing surfaces.

In Figures 4 and 5 a slightly modified construction is illustrated in which the formation of the axially extending projections on the elements 36 and 37 is effected in a different manner from that described in connection with Figures 1–3 inclusive. Thus Figures 4 and 5 show a construction in which the plates 36 and 37 are fluted adjacent their peripheries as shown at 52, the fluted portions or projections of the opposed plates being staggered so that relative movement of the component parts of the damper effects direct compression of the rubber as with the construction first described. These plates may be very conveniently formed by a simple pressing operation into the desired fluted shape. It will be observed that in Figure 4 of the drawings two projections from one of the elements 36 extend between each pair of projections on the opposed element 37, whereas in Figure 5 the construction of the two elements 36 and 37 is substantially identical so far as the fluted portions thereof are concerned.

The friction coupling 35 thus constitutes a unitary assembly which may be formed separately from the other elements of the damper and applied to the conventional inertia member 27 and hub flange 26 by riveting the respective elements 36 and 37 thereto, the formation of the several parts of the coupling 35 and their assembly in the conventional damper being readily and inexpensively effected.

The embodiments of the invention disclosed herein have been described specifically in order to facilitate an understanding of the principles of the invention, but it will be understood that no limitation of the scope of the invention is thereby intended, and that various changes and alterations may be made without departing from the spirit of the invention as defined in the appended claims.

Having thus described the invention, what is claimed as new and desired to be secured by Letters Patent is:

1. In a vibration damper for crankshafts, the combination with an inertia member supported for rotation with respect to the shaft, of a pair of annular elements carried by the shaft and inertia member respectively, said elements having opposed spaced operative friction faces, means of friction developing material interposed between said faces and contacting therewith, and means of elastic material interposed between said faces, said elements being provided with means cooperating to deform said elastic material on the occurrence of relative circumferential displacement of the inertia member and shaft.

2. In a vibration damper for crankshafts, the combination with an inertia member supported for rotation with respect to the shaft, of a pair of annular elements carried by the shaft and inertia member respectively, said elements having opposed spaced friction faces, means of friction developing material interposed between said faces and contacting therewith, each of said elements being provided with projecting portions extending axially of the shaft and toward the other element, the projecting portions on the two elements being arranged in staggered relation, and means of elastic material interposed axially between the elements and circumferentially between said projecting portions, whereby the said elastic means may be subjected to deformation on the occurrence of relative circumferential displacement of the inertia member and shaft.

3. In a vibration damper for crankshafts, the combination with an inertia member supported for rotation with respect to the shaft, of a pair of annular elements carried by the shaft and inertia member respectively, said elements having opposed spaced friction faces, means of friction developing material interposed between said faces and contacting therewith, and elastic means composed of rubber interposed between said faces and forming therewith a closure for said first named means, each of said friction faces having portions projecting toward the opposed face and extending within said elastic means, whereby the latter may be deformed on displacement of the inertia member with respect to the shaft.

4. In a vibration damper for crankshafts, the combination with an inertia member supported for rotation with respect to the shaft, of a pair of annular elements carried by the shaft and inertia member respectively, said elements having opposed spaced friction faces, means of friction developing material interposed between said faces and contacting therewith, and elastic means composed of rubber interposed between said faces, surface bonded thereto, and forming therewith a closure for said first named means, each of said friction faces having portions projecting toward the opposed face and extending within said elastic means, whereby the latter may be deformed on displacement of the inertia member with respect to the shaft.

5. In a vibration damper for crankshafts, the combination with a member mounted for rotation with the shaft, of an inertia member mounted for movement with respect to the shaft, a pair of annular plates, one secured to each of said members, friction means interposed between and engaging said plates, and rubber rings within and surrounding said friction means and adhering to said plates to exclude moisture from the cooperating surfaces of said plates and said disc, said plates being constructed to afford projecting portions arranged in staggered relation and projecting into one of said rubber rings.

6. In a vibration damper for crankshafts, the combination with members supported for relative movement about the crankshaft axis in response to torsional vibration induced in the shaft, said members having opposed, axially spaced surfaces, of friction means interposed between and frictionally engaging said surfaces, and annular elements of elastic material impervious to moisture within and surrounding respectively said friction means, positioned between and adhering to said surfaces, to exclude moisture from said friction means and the cooperating portions of said surfaces, said surfaces being provided with portions extending axially toward each other and into one of said annular elements to provide an elastic connection between said members.

7. In a vibration damper for crankshafts, the combination with members supported for relative movement about the crankshaft axis in response to torsional vibration induced in the shaft, said members having opposed, axially spaced annular surfaces, of annular friction means interposed between and frictionally engaging said surfaces, and annular elements of elastic material impervious to moisture within and surrounding respectively said friction means, positioned between and adhering to said surfaces, to exclude moisture from said friction means and the cooperating portions of said surfaces, said surfaces having cooperating staggered axially projecting portions embedded within one of said annular elements to afford a yielding connection between said members.

8. In a vibration damper for crankshafts, the combination with a hub member adapted to be secured to the shaft, of inertia means mounted on said hub member for movement with respect thereto in response to shaft vibration, and friction means interposed between said members, said friction means comprising a pair of annular plates, one secured to each of said members, an annular disc of friction material interposed between said plates, and rubber rings within and surrounding respectively said disc and vulcanized to said plates to exclude moisture from the cooperating surfaces of said plates and said disc, said plates being provided with axially projecting means cooperating with one of said rubber rings to afford a yielding connection between said members.

9. In a vibration damper, the combination with a hub member, of an inertia member supported for rotation on the hub member, means including cooperating friction elements acting between said members to retard relative rotation therebetween, said elements having cooperating friction developing surfaces, and means comprising rubber positioned between said two opposed friction elements, each of the latter being provided with portions projecting toward the other and cooperating with said last named means to afford a yielding connection between said members.

10. An assembly for connecting the inertia member and a crankshaft in a vibration damper, comprising in combination, a pair of elements presenting spaced opposed friction faces, means of friction developing material interposed between and cooperating with said friction faces, and resilient means composed of rubber interposed between and contacting with said elements and surrounding said friction faces and said first named means, said elements having projecting portions embedded in said resilient means to afford an elastic connection between said elements.

11. An assembly for connecting the inertia member and a crankshaft in a vibration damper, comprising in combination, a pair of spaced annular plates, an annular friction developing member interposed between said plates and contacting therewith, a rubber annulus surrounding said member and interposed between said plates, each of said plates being provided with portions projecting into said annulus to afford a yielding connection between the plates.

12. An assembly for connecting the inertia member and a crankshaft in a vibration damper, comprising in combination, a pair of spaced annular plates, an annular friction developing member interposed between said plates and contacting therewith, a rubber annulus surrounding said member, said annulus being interposed between and bonded to said plates, and projections on said plates extending into said annulus.

13. An assembly for connecting the inertia member and a crankshaft in a vibration damper, comprising in combination, a pair of spaced annular plates, an annular friction developing member interposed between said plates and contacting therewith, a rubber annulus surrounding said member, said annulus being interposed between and bonded to said plates, and projections on said plates extending into said annulus, and a second rubber annulus lying within said friction member and bonded to said plates to exclude foreign matter from the cooperating friction surfaces of said member and said plates.

14. An assembly for connecting the inertia member and a crankshaft in a vibration damper, comprising in combination, a pair of elements presenting spaced opposed friction faces, means of friction developing material interposed between and cooperating with said friction faces, and resilient means composed of rubber interposed between and contacting with said elements, said resilient means being under tension to urge said elements toward one another to increase the amount of friction developed at the said faces.

15. In a vibration damper for crankshafts, the combination with an inertia member supported for rotation with respect to the shaft, of a pair of annular elements carried by the shaft and inertia member respectively, said elements having opposed spaced friction faces, means of friction developing material interposed between said faces and contacting therewith, and means of elastic material interposed between said faces, said last named means being under tension to urge said elements toward one another for increasing the friction developed by said first named means on occurrence of relative rotation between said member and said crankshaft.

16. In a vibration damper for crankshafts, the combination with a pair of relatively movable elements, means associated with said elements and acting therebetween to develop friction on the occurrence of such relative movement, and means composed of rubber associated with said elements and affording a yielding connection between the latter, said last named means being initially set to yieldingly urge said elements toward one another to increase the friction developed 17. In a vibration damper for crankshafts, the combination with an inertia member supported for rotation with respect to the shaft, of a pair of annular elements carried by the shaft and inertia member respectively, said elements having opposed spaced friction faces, means of friction developing material interposed between said faces and contacting therewith, and means of elastic material interposed between said faces, and a plurality of substantially U-shaped members secured to each of said faces adjacent the bases thereof and having the legs thereof extending toward the other of said faces and into said elastic means.

18. In a vibration damper, the combination with a hub member, of an inertia member supported for rotation on the hub member, means including opposed friction elements acting between said members to retard relative rotation therebetween, said elements having cooperating friction developing surfaces, means comprising rubber positioned between the opposed friction elements, and flanged elements welded to each of said last named elements and extending into the rubber means to afford a yielding connection between said members.

19. In a vibration damper for crankshafts, the combination with an inertia member supported for rotation with respect to the shaft, of a pair of annular elements carried by the shaft and inertia member respectively, said elements having opposed spaced friction faces, means of friction developing material interposed between said faces and contacting therewith, and means of elastic material interposed between said faces, said elements having fluted portions engaging said elastic means to yieldingly connect said shaft and inertia member for rotation.

20. In a vibration damper, the combination with an inertia member and a shaft carried member, of a friction connection between said members, and deformable means yieldingly connecting said members, said deformable means being initially tensioned, and means whereby the tensioning of said deformable means is applied to increase the effective pressure of said friction connection.

WALTER R. GRISWOLD.